UNITED STATES PATENT OFFICE.

W. ADOLF OTT, OF BROOKLYN, NEW YORK, ASSIGNOR TO HIMSELF AND HENRY JACKSON, OF SAME PLACE.

IMPROVED PROCESS FOR TREATING AURIFEROUS ORES.

Specification forming part of Letters Patent No. 47,497, dated April 25, 1865.

*To all whom it may concern:*

Be it known that I, W. ADOLF OTT, of Brooklyn, in the county of Kings, and State of New York, have invented a new and Improved Process for Treating Auriferous and other Ores; and I do hereby declare that the following is a full, clear, and exact description of the same.

This invention consists in the employment or use of a mixture of hypochlorous acid in extracting gold from auriferous ores, and particularly from pyrites containing gold.

In order to carry out my process, I prepare the ore by stamping the same and roasting it until all the metal salts contained therein are transformed into sulphates; or, if the ore consists of a mixture of sulphide of copper and sulphide of iron containing much sulphur, in which the sulphide of copper incloses the gold, it must be thoroughly roasted until a concentration of the sulphide of copper has been effected and the iron has been separated from the copper. The ores, after having been thus prepared, are moistened with a sufficient quantity of water to bring them into a loose woolly state, and in this state they are subjected to the action of hypochlorous acid. This acid is obtained by passing chlorine gas through a retort containing a concentrated solution of simple sulphate of soda, $(NaO, SO^3)$. By gently heating the retort hypochlorous acid is formed according to the following formula: $2(NaO, SO_3) 2Cl = NaO, 2.S.O_3 + NaCl\&ClO$.

The quantities of the materials used in producing the hypochlorous acid cannot be determined, because they change according to the nature of the ores and the quantity of sulphur contained therein; but at all events enough chlorine-gas must be used to transform the sulphate of soda completely in a double sulphate. It must be remarked that the ore, in order to be treated with hypochlorous acid, must be placed in earthen vessels or in casks lined with lead. If the action of the hypochlorous acid is completed, which can be ascertained if the smell of sulphurous acid stops, tepid water is passed through the ore and the auriferous lye is precipitated by introducing it in the form of a fine shower into a chamber filled with sulphureted hydrogen. The precipitate is collected and dissolved in aqua regia and the gold is precipitated from this solution by the application of sulphate of iron.

Sulphureted hydrogen is produced by passing steam, or the gases emitted by burning uncarbonized materials, through an oven containing pyrites with imperfect circulation of air. On account of this limited circulation of air the carbonic oxide, having the greatest affinity for oxygen, burns first, whereas the hydrocarbons, by coming in contact with the sulphurous vapors rising from the pyrites, decompose and form sulphureted hydrogen and carbon.

The different effect produced by the use of hypochlorous acid and of chlorine-gas (which is now used) will be apparent from the following observations: If chlorine-gas is brought in contact with the ore prepared as above stated, the water used for moistening the ore is saturated with chlorine, and wherever it comes in contact with gold it dissolves the same. Toward the close of the operation simple chloride of sulphur $(S_2Cl)$ is formed, and thereby the steam or vapor carried away by the chlorine-gas is decomposed into hydrochloric acid, sulphur, and sulphurous acid. As long as moist chlorine-gas is present the sulphurous acid is transformed into sulphuric acid, and the hydrochloric acid, unless brought in direct contact with metal oxides or alkaline earths, absorbs chlorine; or, if no fresh chlorine is admitted, it forms sulphureted hydrogen when brought in contact with the primary or secondary combination of sulphur. In the former case a waste of chlorine-gas takes place, and in the latter a portion of the chloride of gold already formed is decomposed and lost for the process. The effect is quite different, if, instead of chlorine-gas, hypochlorous acid is used in treating ores. In this case not the chlorine, but the oxygen is the acting element. If it meets sulphur it transforms the same into the highest oxidized combination, and where the hypochlorous acid is brought in contact with hydrochlorous acid, a decomposition takes place according to the following formula: $ClO\&HCe = HO\&2Cl$. By the use of the hydrochloric acid, therefore—or, more properly speaking, by the oxygen brought into action—any loss of such acid or any separation of gold is avoided. It must be further remarked that in using hypochloric acid the chlorine gas is brought into action *in statu nascente*, and it is a well-known fact that a gas or other substance, when brought into action in this state, has a much more powerful effect than it has under ordinary circumstances.

I claim as new and desire to secure by Letters Patent—

The use, in treating auriferous ores, and particularly pyrite containing gold, of hypochlorous acid, substantially in the manner herein set forth.

W. AD. OTT.

Witnesses:
M. M. LIVINGSTON,
WM. F. MCNAMARA.